Jan. 4, 1966    A. L. LITMAN    3,227,065
WATERLESS EGG COOKER

Filed June 7, 1963    2 Sheets-Sheet 1

INVENTOR
Alan L. Litman
Green, McCallister &
Miller
HIS ATTORNEYS

Jan. 4, 1966                A. L. LITMAN                3,227,065
                         WATERLESS EGG COOKER
Filed June 7, 1963                                    2 Sheets-Sheet 2

INVENTOR
Alan L. Litman
Green, McCallister & Miller
HIS ATTORNEYS

United States Patent Office
3,227,065
Patented Jan. 4, 1966

3,227,065
WATERLESS EGG COOKER
Alan L. Litman, 114 Hartwood Drive, Pittsburgh, Pa.
Filed June 7, 1963, Ser. No. 286,321
7 Claims. (Cl. 99—341)

This invention relates to a semi-automatic appliance for hard or soft cooking eggs without the use of water or any thermal conducting liquid whatsoever.

I have observed a need for foolproof apparatus for rapidly cooking eggs to exactly the right texture and degree of doneness, with a minimum of conscious effort on the part of the cook.

Various devices have been employed over a period of years for cooking or assisting in the cooking of so-called hard or soft boiled eggs. These devices range from a simple "hour-glass" type timer that is used by the cook to time the period during which the egg or eggs are immersed in a pan of boiling water, to elaborate cooking devices employing self-contained heating elements that boil a specific, accurately measured amount of water to deliver a thereby predetermined amount of heat to the eggs. All of these existing egg cooking devices still require significant conscious effort on the part of the cook, e.g., watching or listening for a timer, or in carefully metering a predetermined amount of water that is required to determine the end point of the cooking process. Also, these existing egg cookers require regular cleaning due to the use of water and the occassional egg leakage therein.

I have also determined that the flavor and texture of eggs can be improved as a whole, by eliminating the water now used in cooking. Eggs cooked in boiling water often have an undesirable texture due to the mixing of water with the albumen during cooking, through tiny cracks that are accentuated due to the violence of the water boiling. By eliminating water from the cooking process the problem of mixing is obviated.

It has thus been an object of my invention to fully investigate the economical and physical problems that require solution to produce a truly convenient and effective egg-cooking device;

Another object of my invention has been to provide an improved egg-cooking device that is relatively inexpensive to construct, employs no water or other heat transfer medium whatsoever, and can cook at least three eggs to taste in between three to five minutes;

Another important object of my invention has been to provide an improved egg cooker that is constructed and arranged to cook eggs without directly heating the egg-shell;

A further object of my invention has been to provide an improved egg cooker that is readily adaptable to a simple control, such as a switch operating timer whereby the egg cooker will be inexpensive, convenient to use, and accurate in its performance.

These and other important objects of my invention will become apparent to those skilled in the art upon reading and understanding the following disclosure of the invention concepts upon which my invention is based, a description of the illustrative embodiment thereof, and the appended claims.

One phase of my invention involves the use of radiation transferable infrared heat that is readily absorbed by the albumen and yolk of any egg. I have determined that eggshells are quite transparent to infrared radiation in the frequency range of 1.5 to 5 microns. Accordingly, I have found it possible to direct infrared radiation into an egg and heat the egg somewhat uniformly without establishing a high thermal gradient through the egg-shell as is necessary to transfer heat by conduction in the case of egg cookers employing boiling water or steam.

Infrared heat sources are inexpensively available in several forms including convenient enclosed reflector bulbs that operate off regular house voltage. It is thus by a heretofore available but unobvious expedient that I have eliminated the use of heat-transfer mediums such as water and steam, that have, in the past, complicated and hence interfered with the successful operation of existing egg cookers by creating problems of control, heat transfer rate, inconvenience of repeated cleaning, etc.

In addition to the improved cooking ability, low cost, and ready availability of infrared heat for egg cooking, my use of infrared heat effectively eliminates the time delay caused by the presence of a heat transfer liquid. In other words, the time required to bring water to a boil before the eggs begin to cook is completely eliminated. Also, the eggs after cooking are dry and need not be wiped before being placed in a serving dish.

Another phase of my invention relates to a construction of a reflector cover that directs infrared heat rays from a single reflector bulb type infrared source to all surfaces of three eggs thereby cooking the eggs uniformly and simultaneously. The reflector cover consists of a domed enclosing wall that is constructed of highly polished sheet metal or coated glass. When construction of sheet metal, the cover is formed with an outer frusto-conical wall that blends into a tor-like segment which encompasses an inverted pyramid-like surface wherein the faces are concave to face each of the three eggs to re direct heat rays thereinto. The sheet metal reflector cover is made preferably of substantially pure aluminum which can be formed into the not too-intricate shape required by spinning, deepdrawing and pressing or can be fabricated by assemblying the inner pyramid-like surface from a planar development and mounting it into an open central portion of the remaining annular structure. Substantially pure aluminum can be polished and anodized to have an extremely high reflective efficiency with regard to infrared radiation, thus minimizing the heat absorbed by the cover. It is important to reduce the heat absorbed by the cover to increase the efficiency of the bulb and thus minimize the time required to uniformly cook the eggs. Also, the combination of high reflectively with the low mass of the cover prevents a heat lag that would cause cooking to continue after the power supply to the infrared source has been terminated. It will thus be appreciated that due to the absence of initial thermal lag heretofore caused by the necessity for heat transfer liquids, and the absence of large mass, extremely hot components which could cause continued cooking, it is possible as a practical matter to fully and accurately control the cooking with a simple switch operating timer. Furthermore, it is possible to leave the eggs when cooked in the cooker until ready for use and they will not overcook, but will be maintained for a reasonable length of time at serving temperature.

Another important phase of my invention relates to an alternative construction of the reflector cover by which an exceptionally attractive, functionally efficient, and reasonably inexpensive egg cooker can be produced on a relatively large scale basis. While the aluminum or other sheet metal reflector cover described above is suitable and fully operative for use in low volume production where tooling costs are a major consideration, I prefer to employ cast heat resistant glass wherever the tooling cost can be absorbed by volume.

Glass can be readily formed into the intricate shapes required to most efficiently redirect and control random radiant energy waves into and through all surfaces of the eggs. Furthermore, it is possible to provide a dichroic surface onto the glass reflector cover that will reflect up to 97% of the infrared incident thereon but permit up to 75% of the visible light to pass undisturbed. With a dichroic surface, my glass reflector cover appears to the eye to be transparent and accordingly it is a simple matter to position the reflector cavities over the eggs. When the infrared heat source is operating a soft glow of visible light will be emitted through the reflector cover, thus serving as a pilot light and generally increasing the attractiveness of the device as a whole. If desired, a small amount of coloring material can be added to the glass of the reflector cover to further enhance the attractive effect of the visible light passing through the cover. As in the case of the polished aluminum reflector cover, the dichroic coated glass cover will reflect nearly all of the infrared heat incident thereon to provide fast, efficient operation. Also the glass cover will remain at a reasonably low temperature to avoid thermal lags that will introduce inaccuracy into the control of the device by a simple switch-operating timer.

A further phase of my invention relates to an egg support rack for positioning an egg or eggs in the path of the infrared radiation. It is desirable that the egg support means does not absorb too much of the infrared in which case localized hot spots would develop and adversely effect the eggs. It is also desirable that the egg support means not shield any substantial portion of the eggs since shielding would cause localized cold spots that could result in uneven cooking of the eggs. Accordingly, I prefer to employ either a wire spider-like egg support rack that is chrome plated or otherwise highly polished to reflect most of the infrared incident upon it, or an infrared transparent, impervious rack made of material such as a heat resistant quartz-base glass that will transmit rather than absorb most of the infrared incident thereon. I have found that between 25 and 40% of ordinary eggs have thin shells or other imperfections that cause them to crack slightly upon heating and such cracking will occasionally permit a small amount of egg white or albumen to drip from the egg. If this egg white were to drip upon the infrared source, an objectionable odor would be created. The use of an impervious infrared transparent egg rack that is readily removable for washing, completely avoids any problem of dripping egg white. This same problem can be easily solved when a wire egg support rack is employed, by providing a flat infrared transparent plate between the infrared source and the egg rack. It will be appreciated that while the impervious egg rack appears to be the most desirable solution to the various problems, it also involves a much higher initial tooling cost. Thus for low volume productions, it may be more practical to employ the wire spider-rack and flat glass plate.

A further important phase of my invention relates to the control of infrared energy entering the narrow end of an egg. For purposes of handling, it is desirable to support the eggs in a small-end-down orientation, thus leaving the more easily handled wide portion free for gripping. I have found that the small end in such orientation will tend to over-cook somewhat due to its proximity to the infrared source as well as its concentrated shape. I have further determined that this problem can be completely and satisfactorily overcome by placing a small infrared shield between the small end of the egg and the infrared source. In the case of a wire spider rack, the shield can be easily constructed by flattening the apex portions of the egg shaped indentations to provide an enlarged cross-like shield. There are many ways to solve the problem in the case of the impervious rack including designing the apex portions of the rack to refract some of the infrared away from the apex of the egg. However, I prefer to mount a small shield or button over the convex apex of the egg-holding indentations. For efficiency's sake, the button should be polished or brightly plated. However, inasmuch as the button is spaced from the egg by at least the thickness of the rack, the egg will not be adversely effected if the button absorbs a substantial amount of infrared energy.

These phases of my invention are exemplified and more fully explained in the following description of a preferred specific embodiment of my invention wherein reference is made to the accompanying drawings of which:

Figure 1:
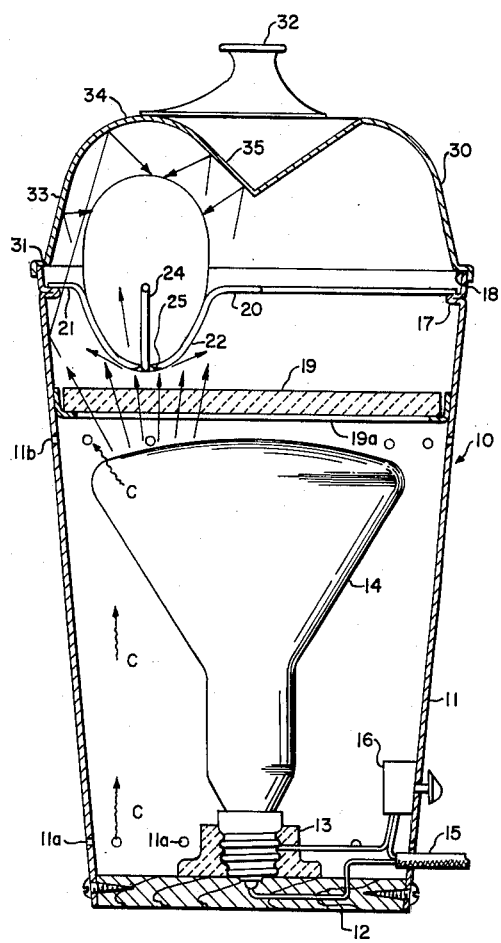
FIGURE 1 is an elevational cross-sectional view of an egg cooker constructed in accordance with my invention.
Figure 2:
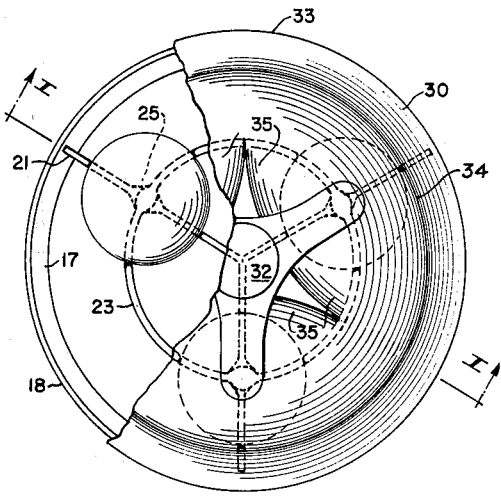
FIGURE 2 is a top or plan view of the device shown in FIGURE 1 wherein a portion of the device has been broken away to show the internal structure thereof.

Referring now more specifically to the drawings, there is shown in FIGURES 1 and 2 a semi-automatic egg cooker 10 having a lower housing or cylindrical casing 11 that is securely connected to a flat-surface-receiving base or stand 12. Within the lower housing 11 there is provided a conventional light socket or bulb receptacle 13 that faces upwardly to supportingly receive the male socket portion of a reflector type bulb 14 that provides a source of infrared radiation. Electric current is supplied to the bulb 14 from an external line 15 that includes in series therewith a simple electric-switch-operating timer 16. Preferably, the timer will be of the type that various time intervals can be selected so that eggs can be cooked with the device for persons having different tastes.

Egg support means such as a rack 20 in the form of a heavy wire spider or frame is positioned in the upper portion of the lower housing 11 on a folded inwardly extending flange or shell 17. The rack 20 is preferably constructed of three radiant bars or arm members 21 each having an egg profile shaped bend 22 formed therein to conform generally to the largest size available eggs. A connector ring or encircling tie member 23 including three egge profile shaped bends 24 each similar to the bends 22 in the radiant members 21 is brazed or otherwise securely connected to the radiant members 21 at the apex of their respective depressions to form three basket-like egg receiving cavities or indentations. The spider is plated and brightly polished to reflect rather than absorb infrared rays incident thereon. I prefer to press-form or flatten the wire in the basket forming portions adjacent the junction between the tie member 23 and the radiant members 21 to provide an enlarged shadow portion or protective shield 25, see FIGURE 2, to protect the narrow tip of the egg from excessive infrared radiation. The egg tip is adequately cooked by heat transferred by conduction from adjacent portions of the egg.

To avoid unpleasant odors caused by egg white or albumen dripping onto the surface of the reflector bulb 14, I provide a protective shield 19 that is constructed of any good infrared transparent, impervious material such as a quartz base glass. The protective shield 19 is of flat plate stock and therefore relatively inexpensive. It is supported by an annular flange 19a which is brazed or riveted to the inner wall of the lower housing 11. To protect the infrared bulb 14 from overheating due to its enclosure, a series of air inlet openings or holes 11a are provided adjacent the bottom of the lower housing 11 and a second series of openings 11b is provided adjacent an intermediate upper portion of the lower housing 11. The two series of openings permit a convective flow of cooling air to pass through the enclosed bulb containing portion of the lower housing 11 as shown by the arrows C.

A cover or reflector lid 30 is provided to fit over the upper end portion of the lower housing 11 and rest on its uppermost edge 18 to enclose the egg-holding rack 20 and efficiently control or reflectively direct infrared heat rays into the eggs positioned upon the egg-holding rack. The cover shown in FIGURES 1 and 2 is constructed of any good infrared reflecting material, preferably substantially pure aluminum having a highly polished and anodized inner surface. The cover 30 is composed of an outer support flange 31 that engages the upper end 18 of the lower housing 11 in a loose surrounding relationship such that the cover 30 can easily be placed in position or removed without disturbing eggs within the housing. A handle or gripping member 32 is attached to the top of the cover 30. The cover 30 includes as part of its composite shape, a peripherally outer frusto-conical section or surface portion 33 that extends upwardly-inwardly around the outer edges of the egg within the housing, a concave-downward annular bridging section or surface portion 34 that is connected at its outer periphery to the frusto-conical portion 33, and an inwardly located pyramid-like section or surface portion having three downwardly inwardly extending concave faces 35 that cooperate with the adjacent conical and bridging portions of the cover to reflect heat from the infrared source into the upper portions of the eggs.

The cover 30 can be partially deep drawn or spun and then stamped or pressed to its final shape. Preferably, the cover is constructed of a single piece; however, it may be desirable, where tooling costs are a significant limitation, to develop the internal pyramid-like surface from a planar sheet and affix this part to the remaining annular structure as a separate operation.

Figure 3:
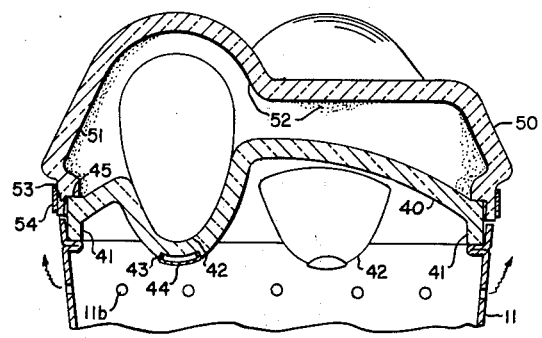
FIGURE 3 is a fragmental elevational cross-sectional view of a modified egg cooker constructed in accordance with my invention.
Figure 4:
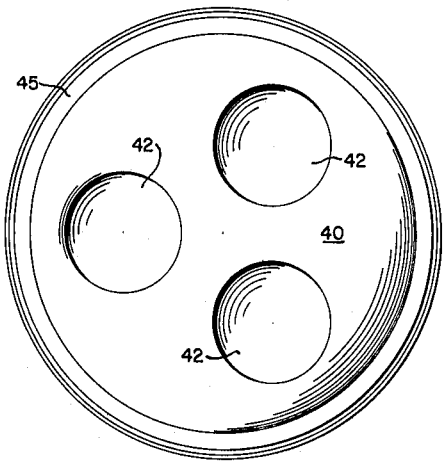
FIGURE 4 is a top or plan view of the modified egg cooker with the reflector cover removed.

Alternative egg support and cover structures are shown in FIGURES 3 and 4. FIGURE 3 shows egg support means consisting of a glass closure wall or rack 40 that is formed basically in the shape of a spherical segment and has a cylindrical support portion 41 formed around its periphery. Three indentations or cavities 42 are formed in a mutually equiangularly spaced relationship to receive three eggs in a vertical orientation in a manner similar to that shown in FIGURES 1 and 2. The glass employed in the rack 40 is, of course, chosen with respect to its infrared transparency and any good quartz-base Pyrex type glass is suitable for this purpose. I find that eggs cooking tend to crack in which event minute amounts of albumen will drip. This does not harm the eggs in any way; however, if the albumen were to drip on the hot infrared reflector bulb, an objectionable odor would be created. The glass rack conveniently avoids this problem. Furthermore, as the glass is transparent to infrared radiation, the rack will not overheat even after repeated use, however, with the rack 20 shown in FIGURES 1 and 2, overheating may occur in the event the reflective plating on the wire becomes damaged or marred through use. It can readily be appreciated that localized hot spots caused by overheating of the wire rack shown in FIGURES 1 through 3 could adversely affect the cooking of the eggs.

Returning to FIGURE 3, there is shown at the apex of each egg-holding indentation a shallow cavity 43 that receives a reflecting button member or protective shield 44 in a tight clamping relationship. The button member 44 serves a purpose similar to that of the expanded section 25 of the wire rack 20 as shown in FIGURE 2, i.e., shading the egg end point to avoid localized overheating.

On a large production basis, glass can often be formed into intricate shapes more easily than sheet metal. Furthermore, for appearance sake, glass is often easier to keep clean and is preferable to many housewives from the standpoint of maintenance and cleanliness over light metal products. FIGURES 3 and 5 show a glass cover 50 that is shaped to provide three individual elongated deformed reflector cavities 51 that operate to direct and control the infrared heat rays from the source into the upper end portion of the eggs.

To make the glass cover reflective, any dense reflective coating such as silver can be employed. However, I find it especially desirable to employ a dichroic surface 52 which has the capability of reflecting nearly all of the infrared radiation in the one to five micron range which is employed in my egg cooker to heat the eggs, while transmitting the visible light produced incidentally by the reflector bulb. Visible light shining through the reflective cover gives a striking appearance to the device and also acts as a pilot light to indicate when the device is in operation. The visible light can be advantageously altered by adding a small amount of coloring material to the glass of the reflector cover to thereby produce a soft colored glow that surrounds the upper end of the egg cooker. The cover 50 is supported by a rim portion 53 that loosely rests on a raised lip or corner 45 of the egg rack 40. To prevent infrared radiation from escaping through the juncture of the cover 50 and rack 40, an aluminum or stainless steel collar or ring 54 is pressed over the lower periphery of the cover 50.

It will be understood that while I have shown the glass rack 40 in combination with a glass reflecting cover that the metal reflecting cover shown in FIGURES 1 and 2 can be satisfactorily employed in combination with my glass egg rack. And, conversely the glass reflecting cover shown in FIGURES 4 and 5 can be employed in combination with the wire spider type egg rack shown in FIGURES 1 and 2.

The operation of my egg cooker, whether employing a wire or glass rack or a metallic or coated glass reflector cover is as follows: One to three eggs are taken directly from the refrigerator and placed in the indentations in the egg-holding rack of my device. The timer is set to start the device and shut it off after a predetermined time (3 to 5 minutes) depending upon the taste of the user. In the event that the eggs are to be served to persons having different tastes, then the timer can be set to the minimum time required for the soft-egg liker. After the cooker has operated, the soft egg or eggs can be removed, and the remaining egg or eggs can be cooked to a higher degree of firmness by re-setting the timer to the additional time required. It will be noted that there is no lag time involved in heating water or any heat-transfer liquid whatsoever, and that the procedure is entirely dry. Furthermore, since the addition of heat is accurately and effectively controlled by the use of a timer (due to the absence of high mass thermal-lag-inducing components), it is possible to repeatedly cook eggs to a consistent texture and degree of doneness. Furthermore, as no liquid comes into contact with the eggs, there is no chance of a mixture of water getting into the eggs to create an undesirable texture as sometimes happens in the case of pan-boiled eggs.

While a preferred embodiment of my invention has been shown herein for purposes of illustration, it is understood that various changes may be made in this construction by those skilled in the art without departing from the spirit and disclosed concepts of the invention as particularly pointed out and defined in the appended claims.

I claim:

1. Apparatus for cooking eggs comprising, heat source means for producing upwardly directed infrared heat radiation, a lower housing extending upwardly around said heat source means, egg support means having a vertically oriented small end-down egg-shaped indentation therein, said egg support means being removably mounted in an upper portion of said lower housing and having downwardly facing polished shield means for diverting infrared heat radiation away from only the apex of said egg-shaped indentations, and reflector means supported above said lower housing to reflectively control heat radiation from said heat source means to direct it through substantially all surfaces of an egg positioned in said indentation.

2. Apparatus as defined in claim 1 further comprising means for controlling the operation of said heat source means in accordance with a predetermined time schedule.

3. Apparatus as defined in claim 1 further comprising an impervious infrared transparent shield that is positioned between said spider and said heat source means.

4. Apparatus as defined in claim 1 wherein said egg support means includes three indentations therein and said reflector means comprises an aluminum cover having an upwardly-inwardly tapered frusto-conical section adjacent its periphery, a concave-downward annular bridging section positioned inwardly of said truncated conical section and connected securely thereto, and an inwardly located pyramid-like section having concave faces that extend downwardly-inwardly from said annular bridging section and are securely connected thereto.

5. Apparatus as defined in claim 1 wherein said reflector means comprises, a glass cover having a downwardly concave reflector surfaces therein and a dichroic coating deposited over said cover to reflect infrared radiation incident thereon and permit visible light to pass therethrough.

6. Apparatus as defined in claim 1 wherein said egg support means comprises an impervious infrared transparent closure wall that is supported adjacent the upper end of said lower housing.

7. Apparatus for cooking eggs comprising, heat source means for producing upwardly directed infrared heat radiation, a lower housing extending upwardly around said heat source means, egg support means comprising a wire spider that includes a plurality of radiant members each having an egg-shaped bend therein and an encircling tie member having a plurality of egg-shaped bends therein that cooperate with the bends in said radiant members to form a plurality of vertically oriented small end-down egg-shaped indentations, said spider having a highly reflective surface so that a minimum of heat is absorbed thereby, said egg support means being removably mounted in an upper portion of said lower housing and having downwardly facing polished shield means for diverting infrared heat radiataion away from only the apex of said egg-shaped indentations, and reflector means supported above said lower housing to reflectively control heat radiation from said heat source means to direct it through substantially all surfaces of an egg positioned in said indentation.

References Cited by the Examiner

UNITED STATES PATENTS

| | | | |
|---|---|---|---|
| 865,527 | 9/1907 | Radtke | 99—440 |
| 1,433,824 | 10/1922 | Jensen | 99—440 |
| 2,057,421 | 10/1936 | Dickson | 219—34.12 X |
| 2,134,474 | 10/1938 | Gillespie | 99—447 |
| 2,428,090 | 9/1947 | Naeher et al. | 99—447 |
| 2,747,075 | 5/1956 | Occhipinti et al. | 219—19.2 X |
| 2,767,297 | 10/1956 | Benson | 219—19.2 X |
| 2,848,591 | 8/1958 | Taylor | 219—342 |
| 2,864,932 | 12/1958 | Forrer | 219—35 |
| 2,908,213 | 10/1959 | Locke | 99—440 X |
| 3,059,087 | 10/1962 | Perlman | 219—35 |
| 3,098,924 | 7/1963 | Salton et al. | 99—341 X |

FOREIGN PATENTS

| | | |
|---|---|---|
| 145,992 | 4/1952 | Australia. |
| 653,569 | 11/1928 | France. |
| 443,093 | 4/1927 | Germany. |
| 397,598 | 8/1933 | Great Britain. |

IRVING BUNEVICH, *Primary Examiner.*

JEROME SCHNALL, ROBERT E. PULFREY, *Examiners.*

STANLEY P. FISHER, *Assistant Examiner.*